(12) United States Patent
Razzell et al.

(10) Patent No.: US 11,434,177 B2
(45) Date of Patent: Sep. 6, 2022

(54) CERAMIC MATRIX COMPOSITE VANE WITH HYBRID CONSTRUCTION

(71) Applicant: Rolls-Royce plc, London (GB)

(72) Inventors: Anthony G. Razzell, London (GB); Michael J. Whittle, London (GB); Ian M. Edmonds, London (GB)

(73) Assignee: Rolls-Royce plc

( * ) Notice: Subject to any disclaimer, the term of this patent is extended or adjusted under 35 U.S.C. 154(b) by 701 days.

(21) Appl. No.: 16/410,404

(22) Filed: May 13, 2019

(65) Prior Publication Data

US 2020/0392049 A1   Dec. 17, 2020

(51) Int. Cl.
| | |
|---|---|
| *C04B 41/45* | (2006.01) |
| *C04B 35/565* | (2006.01) |
| *C04B 41/50* | (2006.01) |
| *C04B 41/87* | (2006.01) |

(52) U.S. Cl.
CPC ........ *C04B 41/4503* (2013.01); *C04B 35/565* (2013.01); *C04B 41/4537* (2013.01); *C04B 41/5059* (2013.01); *C04B 41/87* (2013.01); *C04B 2235/3826* (2013.01); *C04B 2235/616* (2013.01)

(58) Field of Classification Search
CPC .................................................. C04B 41/4537
See application file for complete search history.

(56) References Cited

U.S. PATENT DOCUMENTS

| | | | |
|---|---|---|---|
| 6,648,597 B1 * | 11/2003 | Widrig | F01D 9/044 415/200 |
| 7,799,405 B1 | 9/2010 | Vance et al. | |
| 9,957,821 B2 | 5/2018 | Duelm et al. | |
| 10,093,777 B2 | 10/2018 | Takebe et al. | |
| 2005/0022921 A1 | 2/2005 | Morrison et al. | |
| 2005/0186878 A1 | 8/2005 | Kostar et al. | |
| 2009/0014926 A1 | 1/2009 | Marini | |
| 2012/0183788 A1 | 7/2012 | Corman et al. | |
| 2014/0209737 A1 * | 7/2014 | Cook | B64C 9/18 244/1 N |
| 2014/0369848 A1 | 12/2014 | Marchal et al. | |
| 2016/0279899 A1 * | 9/2016 | Cantwell | B29C 70/443 |
| 2017/0087745 A1 * | 3/2017 | Cawthorne | B32B 3/02 |
| 2017/0298745 A1 | 10/2017 | Freeman et al. | |
| 2018/0179906 A1 | 6/2018 | Schetzel et al. | |
| 2018/0230823 A1 | 8/2018 | Sippel et al. | |

* cited by examiner

*Primary Examiner* — Robert A Vetere
(74) *Attorney, Agent, or Firm* — Barnes & Thornburg LLP

(57) ABSTRACT

A component for use in a gas turbine engine is made from ceramic materials. The component is made from a core preform containing ceramic reinforcement fibers. A plurality of preform tows are applied on at least a portion of the core preform and extend along at least a portion of the core preform to provide an outermost surface. The core preform and the plurality of preform tows are infiltrated with ceramic matrix material to form a ceramic matrix composite component.

11 Claims, 5 Drawing Sheets

CERAMIC MATRIX COMPOSITE VANE WITH HYBRID CONSTRUCTION

FIELD OF THE DISCLOSURE

The present disclosure relates generally to gas turbine engines, and more specifically to ceramic matrix composite vanes and blades for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. The static vane assemblies may be interspaced with the rotating wheel assemblies to redirect hot gases toward the rotating wheel assemblies. Some rotating wheel assemblies and static vane assemblies positioned in the turbine may be exposed to high temperatures from products of the combustion reaction in the combustor. Such wheel assemblies and static vane assemblies sometimes include components made from ceramic matrix composite materials.

SUMMARY

The present disclosure may comprise one or more of the following features and combinations thereof.

According to one aspect of the present disclosure, a method of forming a component for use in a gas turbine engine includes: applying at least one ceramic ply around a mandrel to form an aerofoil shaped core preform that extends along a axis; covering at least a portion of the aerofoil shaped core preform with a plurality of ceramic reinforcement tow preforms that extend along the aerofoil shaped core preform to form an outermost surface; separating the aerofoil shaped core preform from the mandrel; and infiltrating the preform assembly with ceramic material to provide a one-piece ceramic matrix composite aerofoil.

In some embodiments, the method further includes transitioning the plurality of reinforcement tow preforms from the aerofoil shaped core preform radially outward from the axis to form at least a portion of an outer platform preform and at least a portion of an inner platform preform so that the aerofoil, the outer platform, and the inner platform provide a one-piece ceramic matrix composite vane after the preforms have been infiltrated with ceramic matrix material.

In some embodiments, the reinforcement tow preforms splay radially outwardly as they transition from the aerofoil shaped core preform outer platform preform and from the aerofoil shaped core preform to the inner platform preform such that a space is provided circumferentially between each of the reinforcement tow preforms relative to the axis.

In some embodiments, the method further includes applying a ceramic platform tow preform in each space formed between the ceramic reinforcement tows along the outer platform preform and the inner platform preform without the ceramic platform tows extending along the aerofoil shaped core preform.

In some embodiments, the method further includes coupling at least one first ceramic preform sheet to the aerofoil shaped core preform to provide the outer platform preform with the plurality of reinforcement tow preforms and coupling at least one second ceramic preform sheet to the aerofoil shaped core preform to provide the inner platform preform with the plurality of reinforcement tow preforms.

In some embodiments, a plurality of first preform sheets are interlaid between layers of reinforcement tow preforms to provide the outer platform preform and a plurality of second preform sheets are interlaid between layers of reinforcement tow preforms to provide the inner platform preform.

In some embodiments, the method further includes stabilizing the plurality of reinforcement tow preforms relative to the aerofoil shaped core preform by applying a fugitive polymer material as an adhesive.

In some embodiments, applying the fugitive polymer includes selecting a predetermined amount of fugitive polymer to serve as the ceramic matrix material during the step of infiltrating the preform assembly.

In some embodiments, stabilizing the outer platform preform and the inner platform preform further includes activating the fugitive polymer material by applying at least one of heat and pressure.

In some embodiments, applying the fugitive polymer material includes pre-impregnating each of the reinforcement tow preforms with the fugitive polymer prior to applying the reinforcement tow preforms to the aerofoil shaped core preform.

In some embodiments, the method further includes applying a tackifying agent to each of the ceramic reinforcement tow preforms prior to applying the ceramic reinforcement tow preforms to the aerofoil shaped core preform.

In some embodiments, the method further includes providing a ceramic filler insert positioned radially between the aerofoil shaped core preform and the plurality of reinforcement tow preforms at a trailing edge of the ceramic matrix composite aerofoil.

According to another aspect of the present disclosure, a ceramic matrix composite vane includes an aerofoil shaped core, an outer platform, and an inner platform. The aerofoil shaped core is arranged to extend along an axis and is made from an aerofoil core preform infiltrated with ceramic matrix material. The outer platform is coupled to the aerofoil shaped core and is made at least partially from an outer platform preform infiltrated with ceramic matrix material. The inner platform coupled to the aerofoil shaped core and made at least partially from an inner platform preform infiltrated with ceramic matrix material.

In some embodiments, the outer platform and the inner platform comprise a plurality of ceramic reinforcement tow preforms that extend continuously from the aerofoil core preform to the outer platform preform and from the aerofoil core preform to the inner platform preform and provide outer surfaces of the aerofoil shaped core, the outer platform, and the inner platform.

In some embodiments, the ceramic reinforcement tow preforms splay outwardly as they transition from the outer surface of the aerofoil core preform to the outer platform and from the outer surface of the aerofoil core preform to the inner platform such that a space is provided between each of the ceramic reinforcement tow preforms in the outer platform preform and in the inner platform preform.

In some embodiments, the vane further includes a plurality of ceramic platform tow preforms integrated into the outer platform and the inner platform, at least one ceramic platform tow preform positioned in each space formed between the ceramic reinforcement tow preforms in the outer platform and the inner platform without the ceramic platform tow preforms extending along the aerofoil shaped core.

In some embodiments, a first end of aerofoil shaped core extends axially beyond the outer platform and a second end of the aerofoil shaped core extends axially beyond the inner platform to provide an axially-inner section of the aerofoil shaped core and a pair of axially-outer protruding sections of the aerofoil shaped core.

In some embodiments, the plurality of reinforcement tow preforms include an axially-inner set that extend from the axially-inner section of the aerofoil shaped core to the outer platform and the inner platform and a pair of axially-outer sets that extend from corresponding axially-outer protruding sections of the aerofoil shaped core to the outer platform and the inner platform.

In some embodiments, the outer platform and the inner platform each include a plurality of layers of ceramic reinforcement tow preforms.

In some embodiments, the outer platform and the inner platform comprise a plurality of ceramic preform sheets and at least one ceramic preform sheet is positioned axially between the plurality of layers of ceramic reinforcement tow preforms.

In some embodiments, the vane further includes a ceramic trailing edge filler insert positioned radially between the aerofoil core preform and the plurality of ceramic reinforcement tow preforms at a trailing edge of the vane.

These and other features of the present disclosure will become more apparent from the following description of the illustrative embodiments.

DETAILED DESCRIPTION OF THE DRAWINGS

Figure 1:
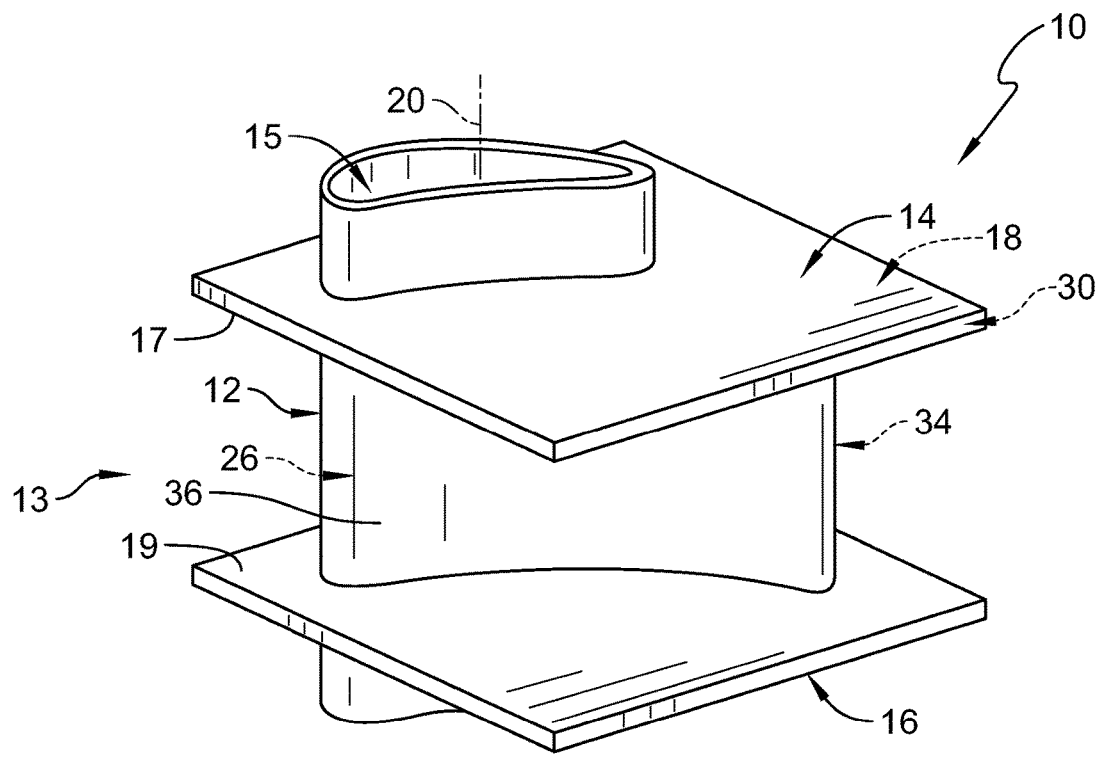
FIG. 1 is a perspective view of an illustrative vane for use in a gas turbine engine and made from ceramic matrix preforms that have been infiltrated with ceramic matrix material to form the vane, the vane including an aerofoil shaped core, an outer platform, and an inner platform.

For the purposes of promoting an understanding of the principles of the disclosure, reference will now be made to a number of illustrative embodiments illustrated in the drawings and specific language will be used to describe the same.

Figure 2:
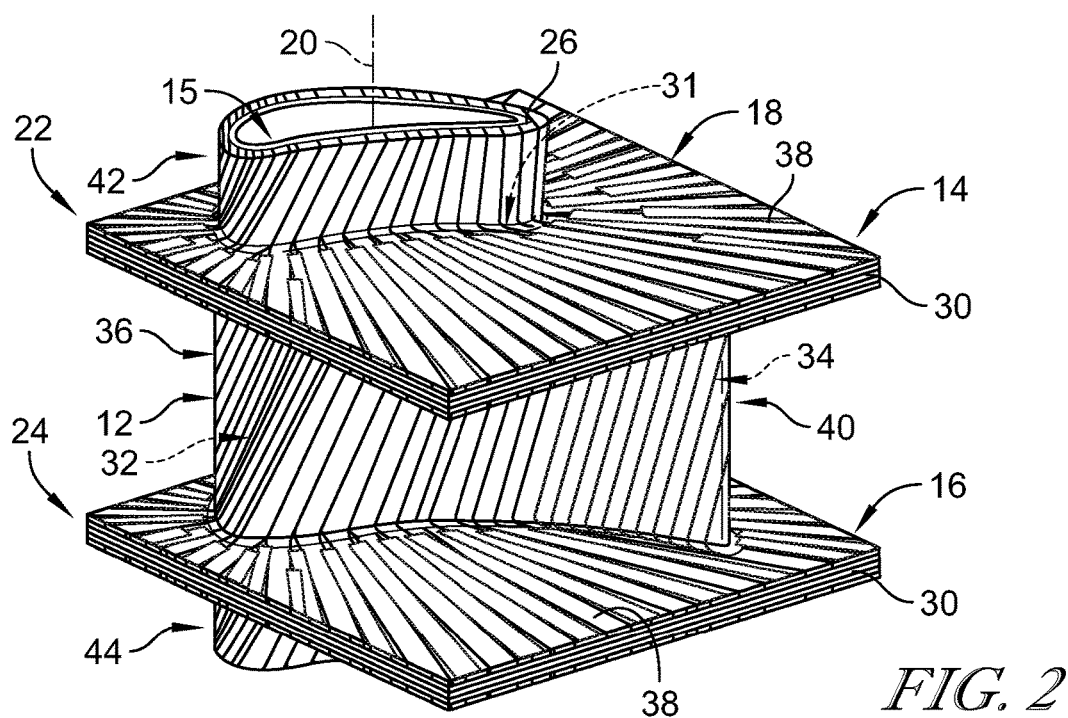
FIG. 2 is a perspective view of the vane from FIG. 1 as a preform assembly prior to infiltration showing outer surfaces of the aerofoil shaped core, the outer platform, and the inner platform covered with a plurality of reinforcement tows to integrate the aerofoil shaped core, the outer platform, and the inner platform together to form a one-piece ceramic matrix composite vane.

An illustrative component 10 for use in a gas turbine engine in accordance with the present disclosure is shown in FIGS. 1 and 2. The component 10 is formed from ceramic matrix composite materials and is illustratively embodied as a vane 10. The vane 10 includes an aerofoil shaped core 12, an outer platform 14, and an inner platform 16. The aerofoil shaped core 12 is arranged to extend along an axis 20 that passes generally through a center of the aerofoil shaped core 12. The outer platform 14 and the inner platform 16 cooperated to define at least a portion of a flow path 13 between an axially-inner surface 17 of the outer platform 14 and an axially-inner surface 19 of the inner platform 16 as shown in FIG. 1.

Figure 3:
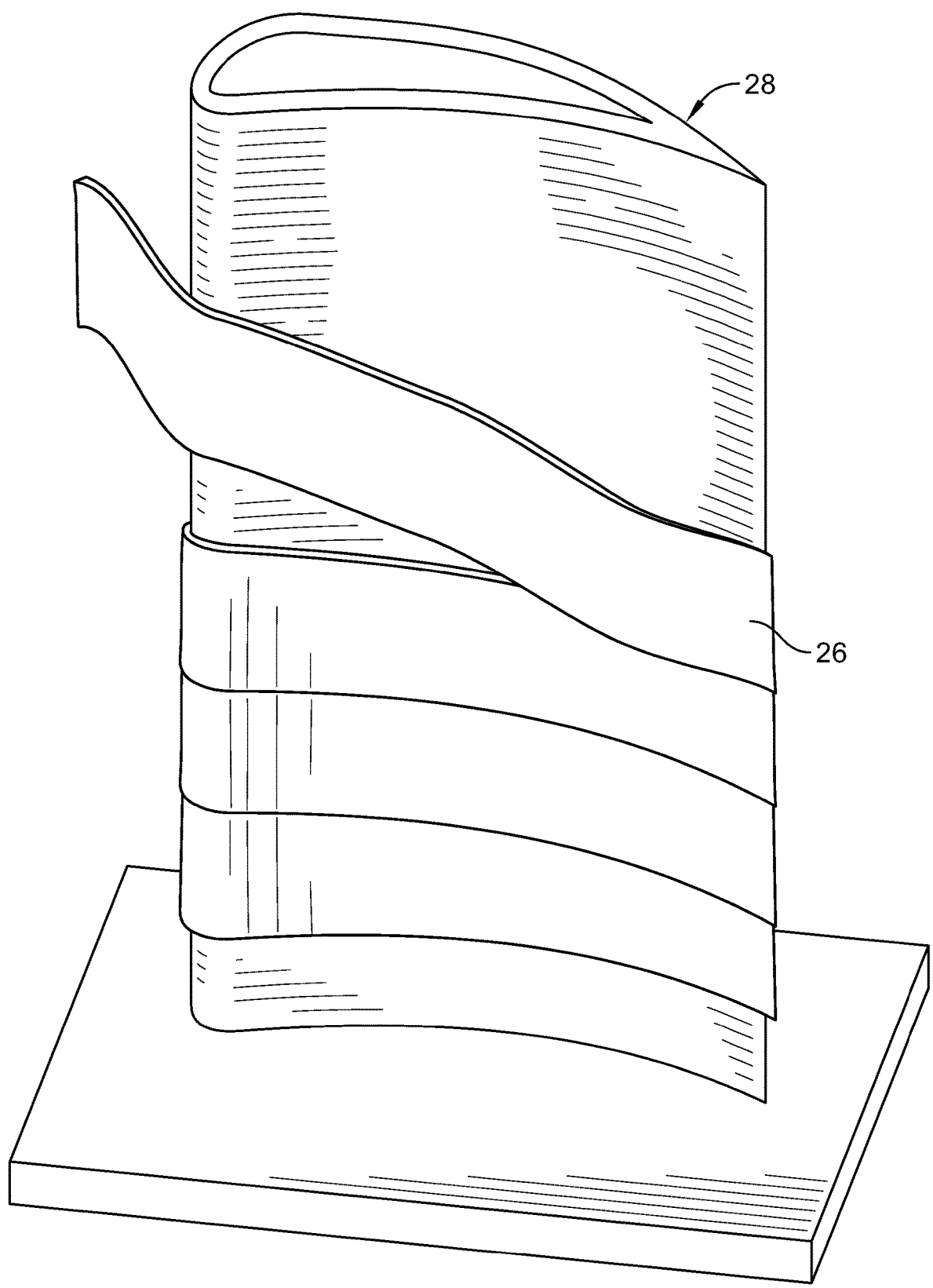
FIG. 3 is a perspective view of a mandrel used to form the aerofoil shaped core and a ceramic ply preform being wrapped around the mandrel to provide an aerofoil shaped core preform.

The vane 10 undergoes a process to integrate the aerofoil shaped core 12, the outer platform 14, the inner platform 16 into the integral, one-piece ceramic matrix composite vane 10. The aerofoil shaped core 12 is made from an aerofoil preform 26 that is wrapped or formed around a mandrel 28 to provide the aerofoil shaped core 12 with an internal cooling cavity 15 as suggested in FIG. 3. The aerofoil preform 26 forming the aerofoil shaped core 12 may be a two-dimensional ply or a three-dimensionally woven or braided tube. The aerofoil preform 26 has a plurality of ceramic fibres, such as, for example, silicon carbide fibres.

To form the vane 10 with the outer and inner platforms 14, 16, an outer platform preform 22 and an inner platform preform 24 are provided relative to the aerofoil preform 26 as shown in FIG. 2. The outer platform preform 22, the inner platform preform 24, and the aerofoil preform 26 are co-infiltrated with a ceramic matrix material such as, for example, silicon carbide or another suitable ceramic matrix material to rigidify the preforms 22, 24, 26 and form the vane 10. In one embodiment, the aerofoil preform 26 may be partially infiltrated with ceramic matrix material prior to application of the inner and outer platform preforms 22, 24 to partially rigidify the preform 26 so that it can support the preforms 22, 24 during their application.

The inner and outer platform preforms 22, 24 each include a plurality of reinforcement tow preforms 18 that are arranged to cover outer surfaces of the aerofoil preform 26 and provide localized reinforcement and/or aerodynamic features for the vane 10 once fully-assembled. The plurality of reinforcement tow preforms 18 extend over the aerofoil preform 26 and then transition radially outwardly away from the axis 20 to form at least a portion of the outer and inner platform preforms 22, 24. In this way, the aerofoil preform 26 is integrated with the outer and inner platform preforms 22, 24.

Although the present disclosure is illustratively embodied as a vane 10 and a method for making the vane 10, it is contemplated that other gas turbine engine components 10 may be made using the preforms and processes described herein. In particular, other components that may be made using the preforms and the processes described herein may include blades, seal segments, or other components in the gas turbine engine.

The outer and inner platform preforms 22, 24 may further include at least one preform sheet 30 interlaid with the plurality of reinforcement tow preforms 18 as shown in FIG. 2. Each of the preform sheets 30 is formed to include an aerofoil-shaped cutout 31. The at least one preform sheet 30 is slid onto the aerofoil preform 26 such that the aerofoil preform 26 is inserted into each aerofoil shaped cutout 31. The plurality of reinforcement tow preforms 18 and the at least one preform sheet 30 are made from ceramic materials similar to those used to form the aerofoil shaped core 12.

In one embodiment, at least one preform sheet 30 is applied to the aerofoil preform 26 first, and the plurality of reinforcement tow preforms are then applied on the outer surfaces of the aerofoil preform 26 and the preform sheet 30 to provide the inner and outer platform preforms 22, 24. In another embodiment, alternating layers of preform sheets 30 and reinforcement tow preforms 18 are applied to provide the inner and outer platform preforms 22, 24. In this case, each layer of reinforcement tow preforms 18 transition from the aerofoil preform 26 to each preform sheet 30.

In the illustrative embodiment, the outermost surface of the inner and outer platform preforms 22, 24 is a layer of reinforcement tow preforms 18, however, in other embodiments one or more preform sheets 30 may provide the outermost layer. In another example, additional ply preform sheets 30 are stacked one top of one another to increase an overall thickness of the outer and inner platform preforms 22, 24. In yet another example, any number of layers of preform sheets 30 and reinforcement tow preforms 18, 38 may be used.

During application of the outer and inner platform preforms 22, 24, the reinforcement tow preforms 18 and the preform sheets 30 are stabilized relative to the aerofoil preform prior to infiltration. In the illustrative embodiment, the reinforcement tow preforms 18 and the preform sheets 30 are stabilized with a fugitive polymer that acts as an adhesive to temporarily bind each reinforcement tow preform 18 and preform sheet 30 to the aerofoil preform 26. In the illustrative embodiment, the fugitive polymer includes polyvinyl alcohol; however, in other embodiments, any suitable fugitive polymer may be used including thermoplastic and thermoset polymers. A suitable tool may also be used to support the reinforcement tow preforms 18 and the preform sheets 30 relative to the aerofoil preform 26 until infiltration.

In the illustrative embodiment, the plurality of reinforcement tows 18 cover outer surfaces of the aerofoil preform 26, and transition to form at least a portion of the outer and inner platform preforms 22, 24 using a computer numerical control (CNC) winding technique or a CNC tow placement lay-up technique. These techniques provides continuous reinforcement from the aerofoil preform 26 to the outer and inner platform preforms 22, 24. The reinforcement tows 18 are first applied over an outer surface 36 of the aerofoil preform 26 in generally parallel relation to one another such that the plurality of reinforcement tows 18 completely cover the outer surface 36.

In the illustrative embodiment, the plurality of reinforcement tows 18 are arranged at an angle relative to the axis 20, however, in other embodiments, the reinforcement tor preforms 18 may be parallel or perpendicular to the axis 20. The angle and/or position of the tow preforms 18 relative to the axis 20 and the density of the tow preforms 18 over the outer surface 36 of the aerofoil preform 26 may be controlled and/or varied to provide an anisotropic vane 10 with personalized and/or optimized structural properties. Additionally, the orientation and/or volume of the reinforcement tow preforms 18 may vary from layer to layer if more than one layer of reinforcement tow preforms 18 are used.

As the plurality of reinforcement tow preforms 18 transition from the aerofoil preform 26 to form the outer and inner platform preforms 22, 24, the reinforcement tow preforms 18 extend radially outward from the axis 20. The plurality of reinforcement tow preforms 18 also spread apart circumferentially from one another as they extend radially from the axis 20. A plurality of platform reinforcement tow preforms 38 are added to the outer and inner platform preforms 22, 24 between the reinforcement tow preforms 18 where they are spaced circumferentially from one another to fill the spaces. In the illustrative embodiment, the platform reinforcement tow preforms 38 are interleaved and/or woven with the reinforcement tow preforms 18; however in other embodiments, the platform reinforcement tows may not be interleaved with the reinforcement tows 18.

As discussed above, the reinforcement tow preforms 18, 38 and the preform sheets 30 are temporarily bound to one another and/or to the aerofoil preform 26 with a fugitive polymer to support the outer and inner platform preforms 22, 24 as they are formed. In one embodiment, the reinforcement tow preforms 18, 38 and the preform sheets 30 are pre-impregnated with the fugitive polymer prior to application. In another embodiment, the fugitive polymer is added to the reinforcement tow preforms 18, 38 and the preform sheets 30 during application. If added during application, the fugitive polymer may be sprayed or added in situ as the reinforcement tow preforms 18, 38 and the preform sheets 30 are laid down.

Figure 5:
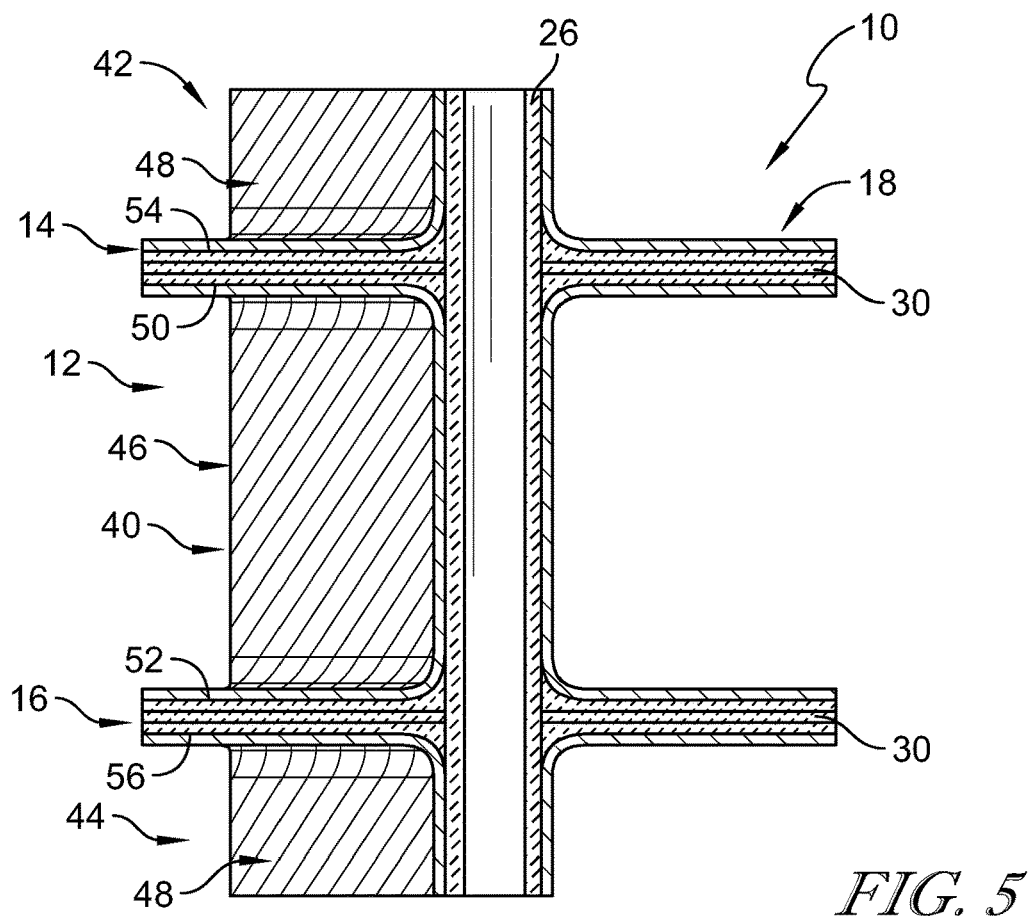
FIG. 5 is a cross-sectional view of the vane showing that the vane includes a plurality of stacked layers of the reinforcement tow preforms, platform tow preforms, and ceramic preform sheets in the outer platform and the inner platform.

In the illustrative embodiment, the inner and outer platform preforms 22, 24 are located axially along the aerofoil preform to provide an axially-inner section 40 and a pair of axially-outer sections 42, 44 that protrude axially beyond the outer and inner platform preforms 22, 24, respectively, as shown in FIGS. 2 and 5. The plurality of reinforcement tow preforms 18 include a first set 46 that cover the axially-inner section 40 of the aerofoil preform 26 and a pair of second sets 48 that cover corresponding axially-outer sections 42, 44 of the aerofoil preform 26 as shown in FIGS. 2 and 5. The first set 46 extends over an outer surface of the axially-inner section 40 and then radially outward to form at least a portion of the outer platform preform 22 and the inner platform preform 24.

The reinforcement tow preforms 18 of the first set 46 define an axially-inner surface 50, 52 of the outer platform preform 22 and the inner platform preform 24. The first set 46 of reinforcement tow preforms 18 have a generally U-shape when viewed perpendicular to the axis 20. The pair of second sets 48 of reinforcement tow preforms 18 extend over an outer surface of each axially-outer section 42, 44, respectively. The second sets 48 transition from each axially outer section 42, 44 and extend radially from the axis 20 to define a corresponding axially-outer surface 54, 56 of the outer platform preform 22 and the inner platform preform 24. Additional platform reinforcement tow preforms 38 are then added to the axially-inner surfaces 50, 52 and the axially outer surfaces 54, 56 in the spaces formed circumferentially between the reinforcement tow preforms 18 that form as a result of the reinforcement tows splaying outwardly from one another. In this way, the outer surfaces of the preforms 22, 24, 26 are covered by reinforcement tow preforms 18, 38 without large gaps between the reinforcement tow preforms 18 where they separate along the platform preforms 22, 24.

Once a desired number of the reinforcement tow preforms 18, 38 and the preform sheets 30 are added to provide the outer and inner platform preforms 22, 24, the preforms 22, 24, 26 are infiltrated with ceramic matrix material to form the aerofoil shaped core 12, the outer platform 14, and the inner platform 16. First, the preforms 22, 24, 26 may be infiltrated with ceramic matrix material by chemical vapor infiltration (CVI). The preforms may be infiltrated further by a slurry-melt infiltration process (SMI). In other embodiments, polymer infiltration/impregnation and pyrolysis or another suitable infiltration process may be used. Following infiltration, the aerofoil shaped core 12, the outer platform 14, and the inner platform 16 are integrated to provide the vane 10.

Figure 6:
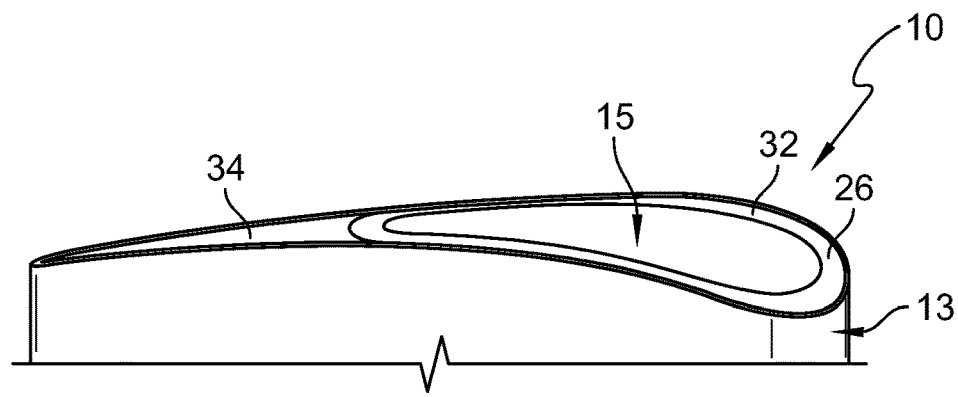
FIG. 6 is a perspective view of a portion of the vane of FIG. 1 with the outer platform removed to show a trailing edge filler insert positioned between the aerofoil shaped core and the reinforcement tow preforms.
Figure 7:
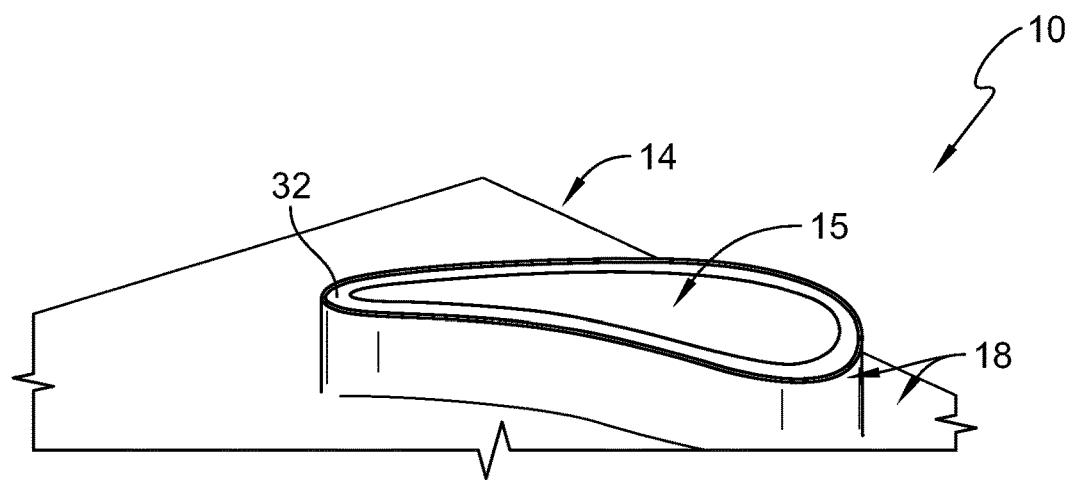
FIG. 7 is a perspective view of a portion of the vane of FIG. 1 with the outer platform present to show that an end of the aerofoil shaped core protrudes past the outer platform and showing the reinforcement tow preforms covering the protruding end of the aerofoil shaped core and the outer platform.

In one embodiment, the aerofoil shaped core 12 includes a primary airfoil 32 and a trailing edge filler 34 as shown in FIG. 6. The reinforcement tow preforms 18 are arranged to cover the primary airfoil 32 and the trailing edge filler 34 to locate the trailing edge filler 34 radially between the primary airfoil 32 and the reinforcement tows 18. The trailing edge filler section 34 extends axially between the outer platform 14 and the inner platform 16 without extending beyond the outer platform 14 and the inner platform 16 as shown in FIG. 7. In some embodiments, the trailing edge filler section 34 may also protrude outward past the outer platform 14 and the inner platform 16 with the axially-outer sections 42, 44 of the primary airfoil 32. In yet another embodiment, ends of the trailing edge filler section 34 may extend into and reside in the outer platform 14 and the inner platform 16, respectively, to provide greater support for the vane 10 as a whole.

Figure 8:
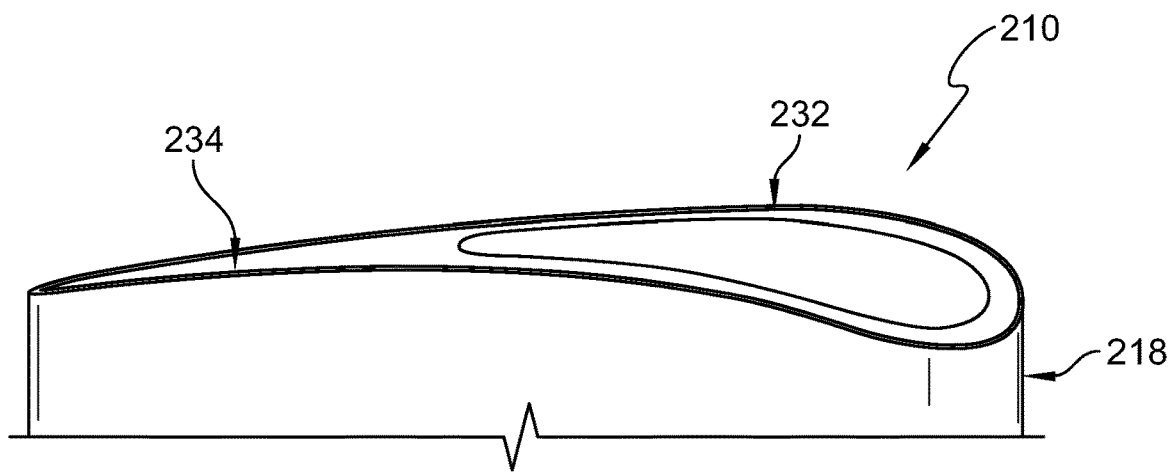
FIG. 8 is a perspective view of a second embodiment of a vane in accordance with the present disclosure with the outer platform removed showing that the vane includes a primary airfoil with an integrated trailing edge section.
Figure 9:
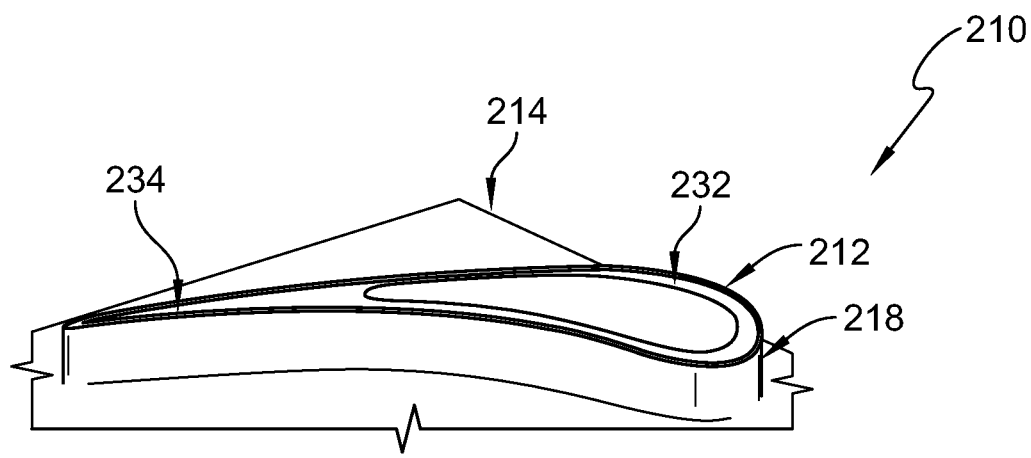
FIG. 9 is a perspective view of the second embodiment of the vane from FIG. 8 showing an end of the primary airfoil protruding past the outer platform.

Another embodiment of a vane 210 is shown in FIGS. 8 and 9. Vane 210 is substantially similar to vane 10. Similar reference numbers in the 200 series are shown in FIGS. 8 and 9 to indicate similar features common between vane 10 and vane 210. Accordingly, the disclosure related to vane 10 is incorporated by reference herein for vane 210 while differences between vane 10 and vane 210 are described below.

The vane 210 includes an aerofoil shaped core 212, an outer platform 214, and inner platform 216 (not shown) as shown in FIGS. 8 and 9. Unlike vane 10, the aerofoil shaped core 212 includes a primary airfoil 232 without a separate trailing edge filler 34. Instead, the primary airfoil 232 is shaped to define a trailing edge 234 and the trailing edge 234 is a part of the primary airfoil 232. The trailing edge 234 extends beyond the outer platform 214 and the inner platform 216 in both axial directions relative to the axis 20 as shown in FIG. 9.

Similarly to vane 10, vane 210 is formed from an aerofoil preform 226, a plurality of reinforcement tow preforms 218, 238, and/or preform sheets 230. The plurality of reinforcement tow preforms 218, 238 cover the aerofoil preform 226 and transition to form at least a portion of the outer and inner platforms 214, 216. Each platform 214, 216 may also be formed from at least one preform sheet 230.

Figure 10:
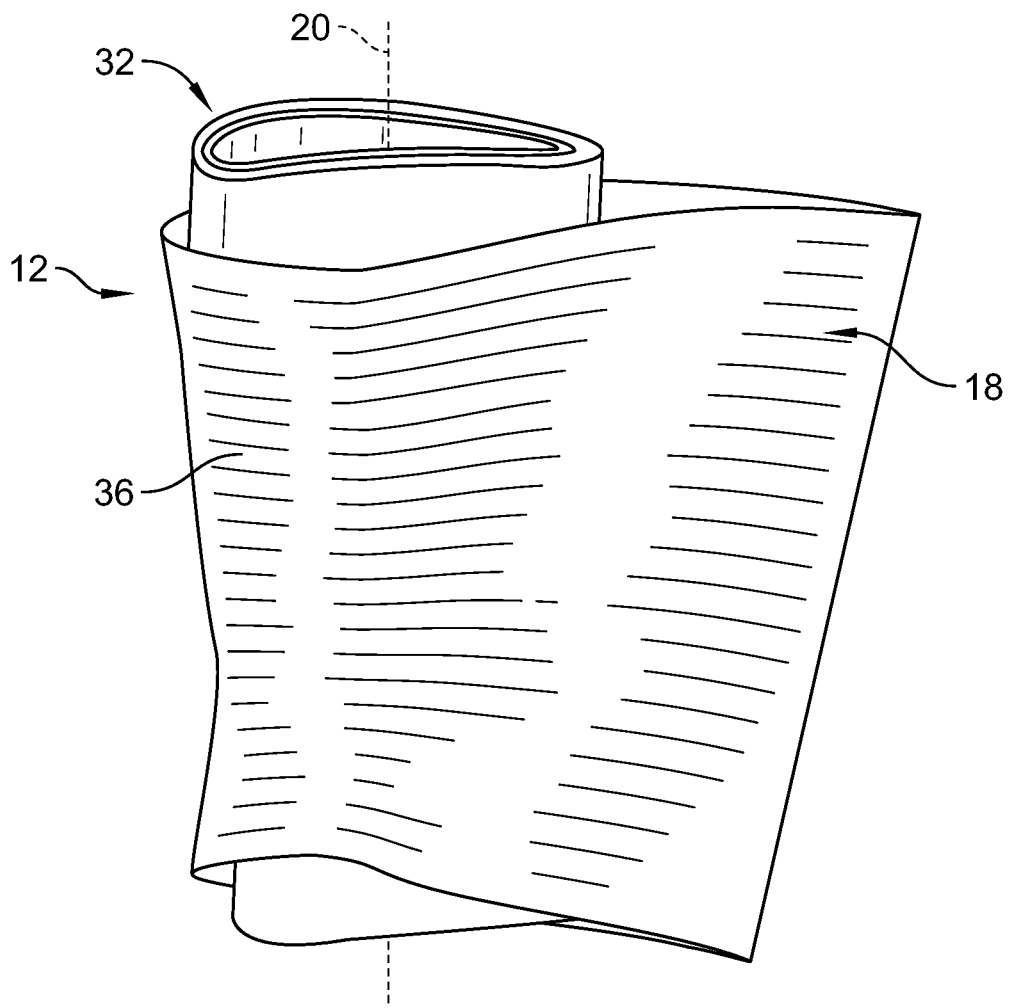
FIG. 10 is a perspective view of a vane showing how the plurality of reinforcement tow preforms may be wrapped around the aerofoil shaped core and formed to have a contour with distinct aerodynamic features.

In the illustrative embodiment, the plurality of reinforcement tow preforms 18, 218 may be shaped relative to the aerofoil preform 26, 226 to provide an outer, or gas-washed, surface 36, 236 with a contour having localized aerodynamic features different from the shape of the aerofoil preform 26, 226 as shown in FIG. 10. In this case, the primary aerofoil 32, 232 provides support for the vane 10, 210 while the outer surface 36, 236 is shaped to interact with gases flowing around the vane 10, 210. The reinforcement tow preforms 18, 218 may be spaced apart radially from the aerofoil preform 26, 226 in some locations and may engage the aerofoil preform 26, 226 in other locations. In the locations where the reinforcement tow preforms 18, 218 are spaced apart from the aerofoil preform 26, 226, ceramic filler material may be provided between the aerofoil preform 26, 226 and the reinforcement tow preforms 18, 218. Alternatively, additional tow preforms 18, 218 may be laid down to act as a filler material between the aerofoil core preform 26, 226 and the outer wrap (i.e. provided by additional tow preforms 18, 218).

Figure 4:
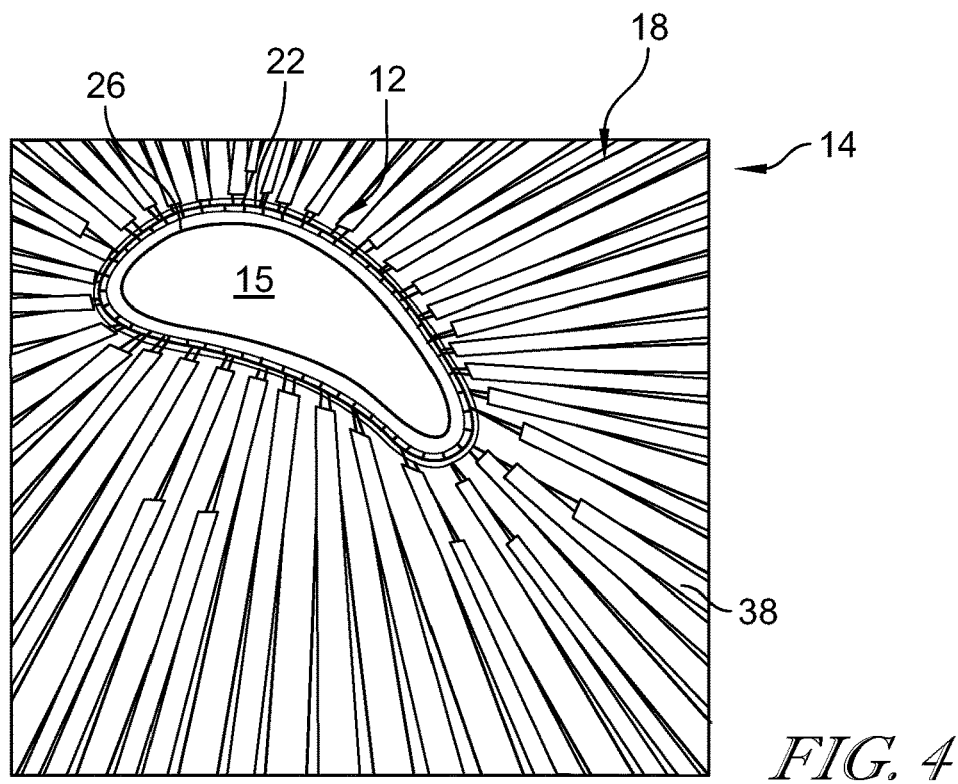
FIG. 4 is a top view of the vane with the outer platform being formed with the plurality of reinforcement tow preforms and showing that the reinforcement tow preforms extend outwardly from the aerofoil shaped core and separate from one another as they extend from the aerofoil shaped core toward an outer perimeter of the outer platform and a plurality of platform tow preforms are interleaved with the reinforcement tow preforms to fill the spaces.

The present disclosure provides a ceramic matrix composite aerofoil component, such as a vane or blade, of hybrid construction as suggested in FIGS. 1 and 2. The aerofoil shaped core 12 may be formed using a 2D preform 26 (wrapped fabric or braided tube) wrapped around a mandrel 28 as suggested in FIG. 3. A trailing edge filler region 34 and optional 2D overwrap 18 is used to form the aerofoil profile as suggested in FIG. 5. The platforms 14, 16 of the vane 10 are formed from woven fabric with cut-outs 22, 24 to accommodate the inner tube 12 (or full aerofoil) in illustrative embodiments as suggested in FIG. 4.

A typical approach of forming a ceramic matrix composite vane would be to pre-form a ceramic matrix composite vane with a 2D construction. Discrete inner tubes and platforms are sometimes used and supported by an overwrap braided tube, distorted to form reinforce the platforms, or to rely on a slurry melt infiltration bonded joint. Such a bonded joint may consist of a SiC particulate slurry/Silicon melt infiltration or a glass or metallic based braze.

In some embodiments, the aerofoil core 12, platforms 14, 16, and trailing edge filler 34 are stabilized with a fugitive polymer binder prior to assembly using polymer (e.g. polyvinyl alcohol) as an adhesive. The assembly is then overwrapped with ceramic fibre tow 18 using a computer numerical control (CNC) filament winding technique or preferably a computer numerical control fibre tow placement/tape lay-up technique which creates continuous reinforcement from the aerofoil core onto the platform and trailing edge filler region of the component on the gas-washed side. Further reinforcing tows 38 are computer numerical control filament wound or computer numerical control tow/tape placed on the non gas-washed side thus strongly binding the aerofoil core, platforms and trailing edge filler into a single component.

The computer numerical control filament winding or computer numerical control fibre tow/tape placement technique allows precise control of fibre angle, position and density and resulting anisotropy as required for optimum structural integrity. The use of tow/tape placement can be used to tune local fibre volume fraction or ply thickness to influence mechanical properties. It can also be used to create local aerodynamic features, for example shaped features on the gas path side of the platforms to reduce secondary flows (profiled endwalls) or to introduce radially changing aerofoil shapes without creating a re-entrant feature in the aerofoil core. It can also be used to ensure the presence of features (e.g. gaps) to allow the impregnation of the assembly during downstream processes such as CVI (Chemical Vapour Infiltration).

In some embodiments, the continuous fibres 18 splay out (in the platform for example), where fibres move from being placed adjacent to each other on the aerofoil 12 to moving apart as they approach the outer edges of the platform 14, 16. In these areas, discontinuous fibre tows 38 may be placed or interleaved between the continuous tow 18 to avoid creating significant areas devoid of fibre reinforcement.

In some embodiments, the fibre tow 18, 38 may use tack in order to temporarily attach it to the preform 12, 14, 16. This may be achieved by pre-impregnating the tow 18, 38 with a fugitive binder that is activated by heat, pressure or other physical/chemical effect. Alternatively, a polymeric binder may be added prior to tow placement using a separate tackifying agent (applied for example by spray) or locally applied in situ as the tow is laid down.

In some embodiments, the placed fibre tows are stably attached to the underlying assembled preform in such a way that they reinforce the preform enhancing handleability as the preform is removed from its supporting tooling 28 at the end of this stage of the manufacturing process. The preform may be transferred to a high temperature capable tool for subsequent processing e.g. by chemical vapour infiltration. This process step may achieve sufficient strength in the preform to allow it to be de-tooled. In certain cases, the fugitive binder may be chosen to degrade to a finite carbonaceous residue that provides a degree of stability during subsequent processing by CVI or carbonaceous residue for in-situ reaction with molten Si to form SiC. In other cases, the polymeric binder system used is designed to yield a refractory material such as silicon carbide upon thermal decomposition that enhances the stability of the preform.

In some embodiments, downstream slurry/melt infiltration (SMI) processes are then used to complete densification of the vane. Alternatively a polymeric precursor for a refractory material such as silicon carbide may be used to densify the vane via one or more polymer impregnation/pyrolysis (PIP) cycles. In a further embodiment, a particulate slurry is used to fill larger scale porosity, followed by infiltration of a polymer precursor via one or more polymer impregnation/pyrolysis cycles.

In some embodiments, the number of tows may be fixed by the braided tube construction and fibre tow placement angle may be increased. Present disclosure allows fibre tows to be placed to provide enhanced local mechanical/thermal properties, including interleaving of discontinuous tows to achieve a suitable fibre volume fraction. The outer platform may be extended to form the downstream seal segment where the distortion in braid angle in the integral seal segment far away from the aerofoil region may be higher than other areas of the vane. The present disclosure may allow tow/tape placement for downstream manufacturing steps such as CVI or slurry infiltration. Tow/tape can also be placed specifically to define and optimize the aerodynamic profile of the vane gas washed surface for maximum aero-efficiency. In the latter case, this decouples the external aerofoil profile from the internal cavity profile thus allowing a simple tapered prismatic core to be used to create the internal cavity profile whilst producing a more complex 3D shaped external profile for increased aerodynamic efficiency.

In some embodiments, the present disclosure is applicable to ceramic matrix composite vanes and blades used in gas turbine engines. In some embodiments, the ceramic matrix composite vanes and blades are used in gas turbine engines 10 which use high overall pressure ratio/high turbine inlet temperature to obtain high thermal efficiency. The manufacturing approach of the present disclosure could be applied to other ceramic matrix composite structures including complex ceramic matrix composite structures.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of forming a component for use in a gas turbine engine, the method comprising
    applying at least one ceramic ply around a mandrel to form an aerofoil shaped core preform that extends along a axis,
    covering at least a portion of the aerofoil shaped core preform with a plurality of ceramic reinforcement tow preforms that extend along the aerofoil shaped core preform to form an outermost surface and to provide a preform assembly,
    separating the aerofoil shaped core preform from the mandrel, and
    infiltrating the preform assembly with ceramic matrix material to provide a one-piece ceramic matrix composite aerofoil,
    further comprising transitioning the plurality of reinforcement tow preforms from the aerofoil shaped core preform radially outward from the axis to form at least a portion of an outer platform preform and at least a portion of an inner platform preform so that the aerofoil, the outer platform, and the inner platform provide a one-piece ceramic matrix composite vane after the preforms have been infiltrated with ceramic matrix material.

2. The method of claim 1, wherein the reinforcement tow preforms splay radially outwardly as they transition from the aerofoil shaped core preform outer platform preform and from the aerofoil shaped core preform to the inner platform preform such that a space is provided circumferentially between each of the reinforcement tow preforms relative to the axis.

3. The method of claim 2, further comprising applying a ceramic platform tow preform in each space formed between the ceramic reinforcement tows along the outer platform preform and the inner platform preform without the ceramic platform tows extending along the aerofoil shaped core preform.

4. The method of claim 2, further comprising coupling at least one first ceramic preform sheet to the aerofoil shaped core preform to provide the outer platform preform with the plurality of reinforcement tow preforms and coupling at least one second ceramic preform sheet to the aerofoil shaped core preform to provide the inner platform preform with the plurality of reinforcement tow preforms.

5. The method of claim 4, wherein a plurality of first preform sheets are interlaid between layers of reinforcement tow preforms to provide the outer platform preform and a plurality of second preform sheets are interlaid between layers of reinforcement tow preforms to provide the inner platform preform.

6. The method of claim 1, further comprising stabilizing the plurality of reinforcement tow preforms relative to the aerofoil shaped core preform by applying a fugitive polymer material as an adhesive.

7. The method of claim 6, wherein the applying the fugitive polymer includes selecting a predetermined amount of fugitive polymer to serve as the ceramic matrix material during the step of infiltrating the preform assembly.

8. The method of claim 6, wherein stabilizing the outer platform preform and the inner platform preform further includes activating the fugitive polymer material by applying at least one of heat and pressure.

9. The method of claim 6, wherein applying the fugitive polymer material includes pre-impregnating each of the reinforcement tow preforms with the fugitive polymer prior to applying the reinforcement tow preforms to the aerofoil shaped core preform.

10. The method of claim 9, further comprising applying a tackifying agent to each of the ceramic reinforcement tow preforms prior to applying the ceramic reinforcement tow preforms to the aerofoil shaped core preform.

11. A method of forming a component for use in a gas turbine engine, the method comprising
applying at least one ceramic ply around a mandrel to form an aerofoil shaped core preform that extends along a axis,
covering at least a portion of the aerofoil shaped core preform with a plurality of ceramic reinforcement tow preforms that extend along the aerofoil shaped core preform to form an outermost surface and to provide a preform assembly,
separating the aerofoil shaped core preform from the mandrel, and
infiltrating the preform assembly with ceramic matrix material to provide a one-piece ceramic matrix composite aerofoil,
further comprising providing a ceramic filler insert positioned radially between the aerofoil shaped core preform and the plurality of reinforcement tow preforms at a trailing edge of the ceramic matrix composite aerofoil.

* * * * *